Nov. 5, 1940.     H. W. ZIMMERMAN     2,220,382
SHAPING MACHINE
Filed Oct. 4, 1937     11 Sheets-Sheet 8

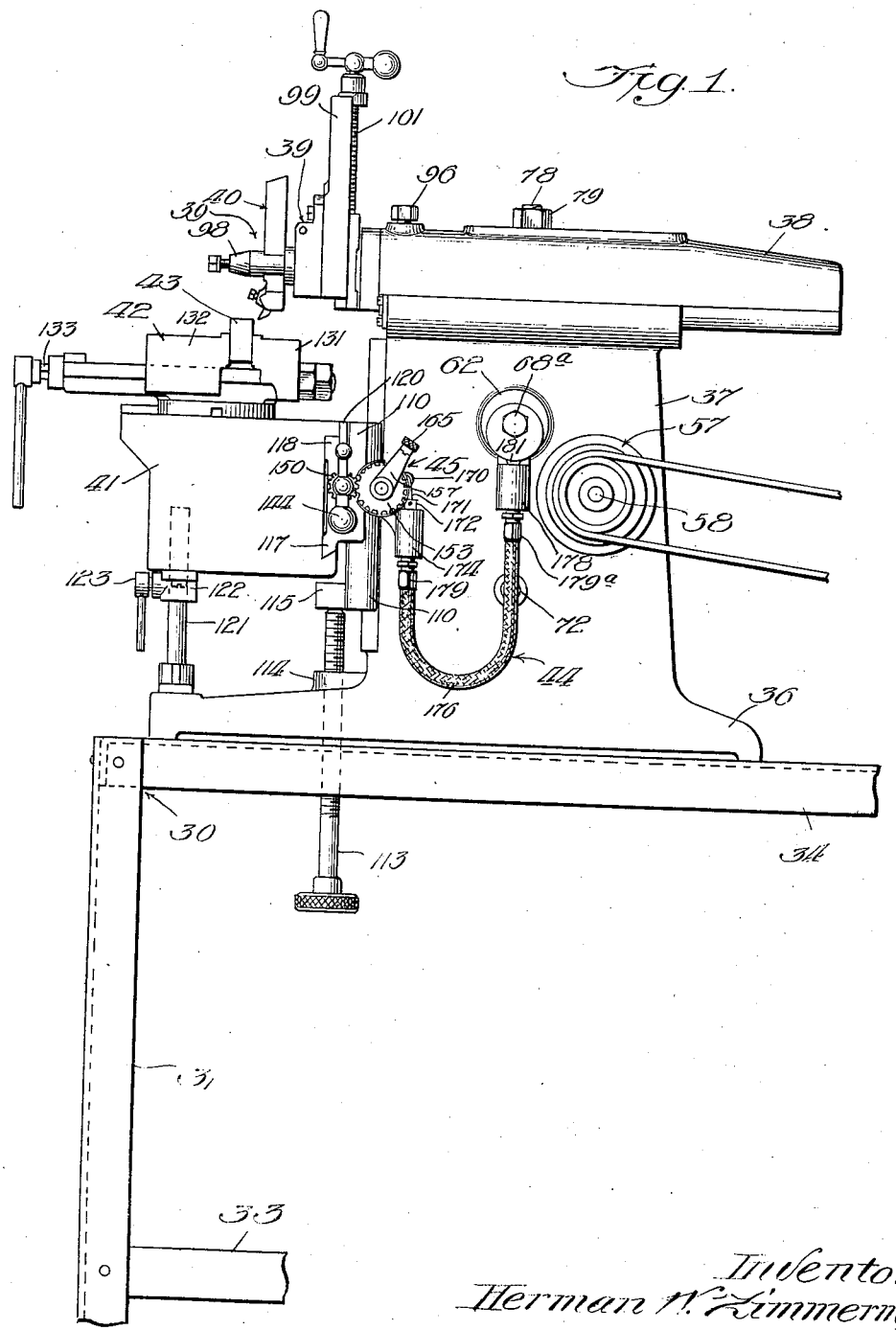

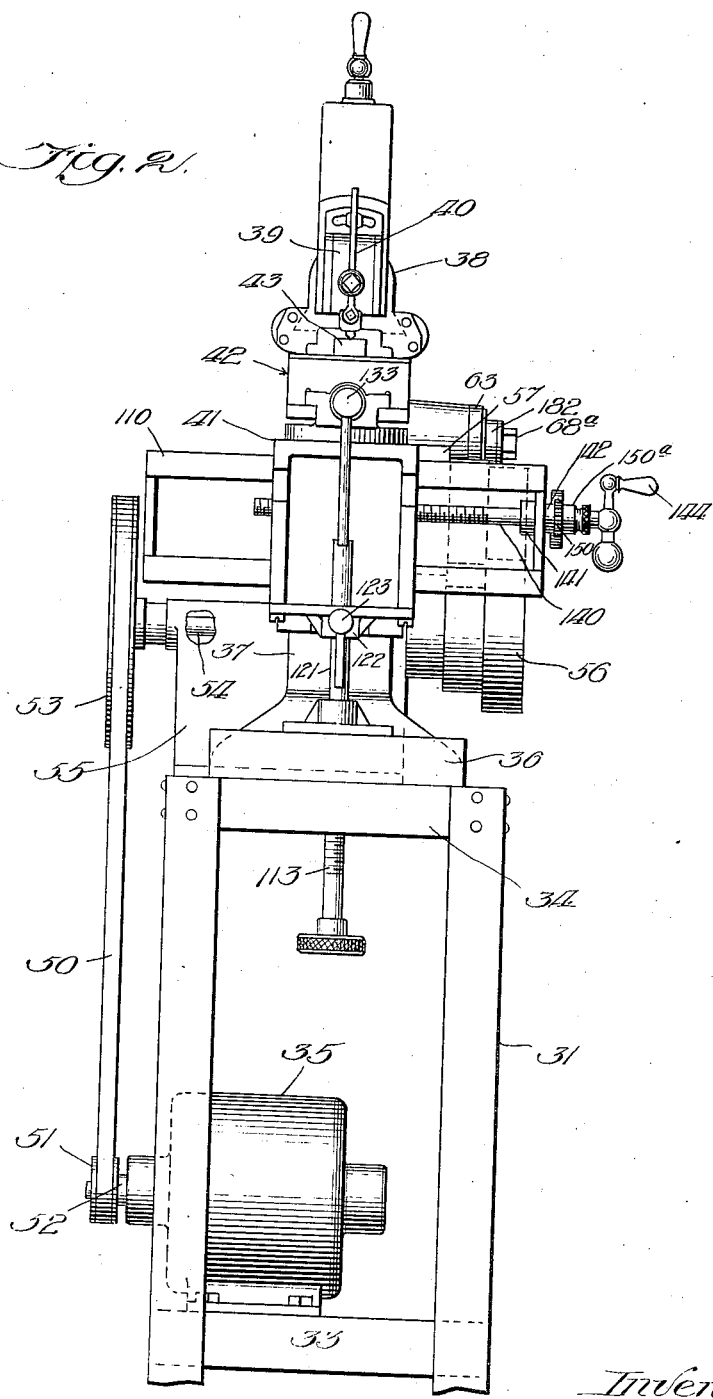

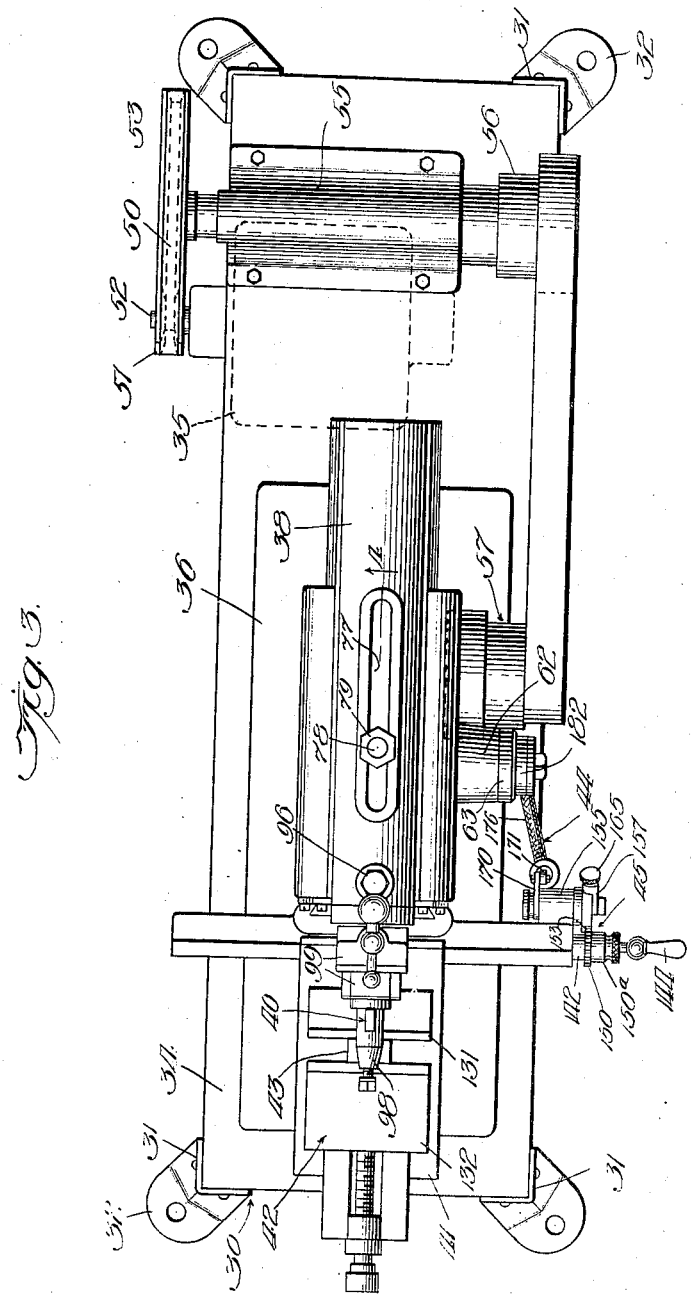

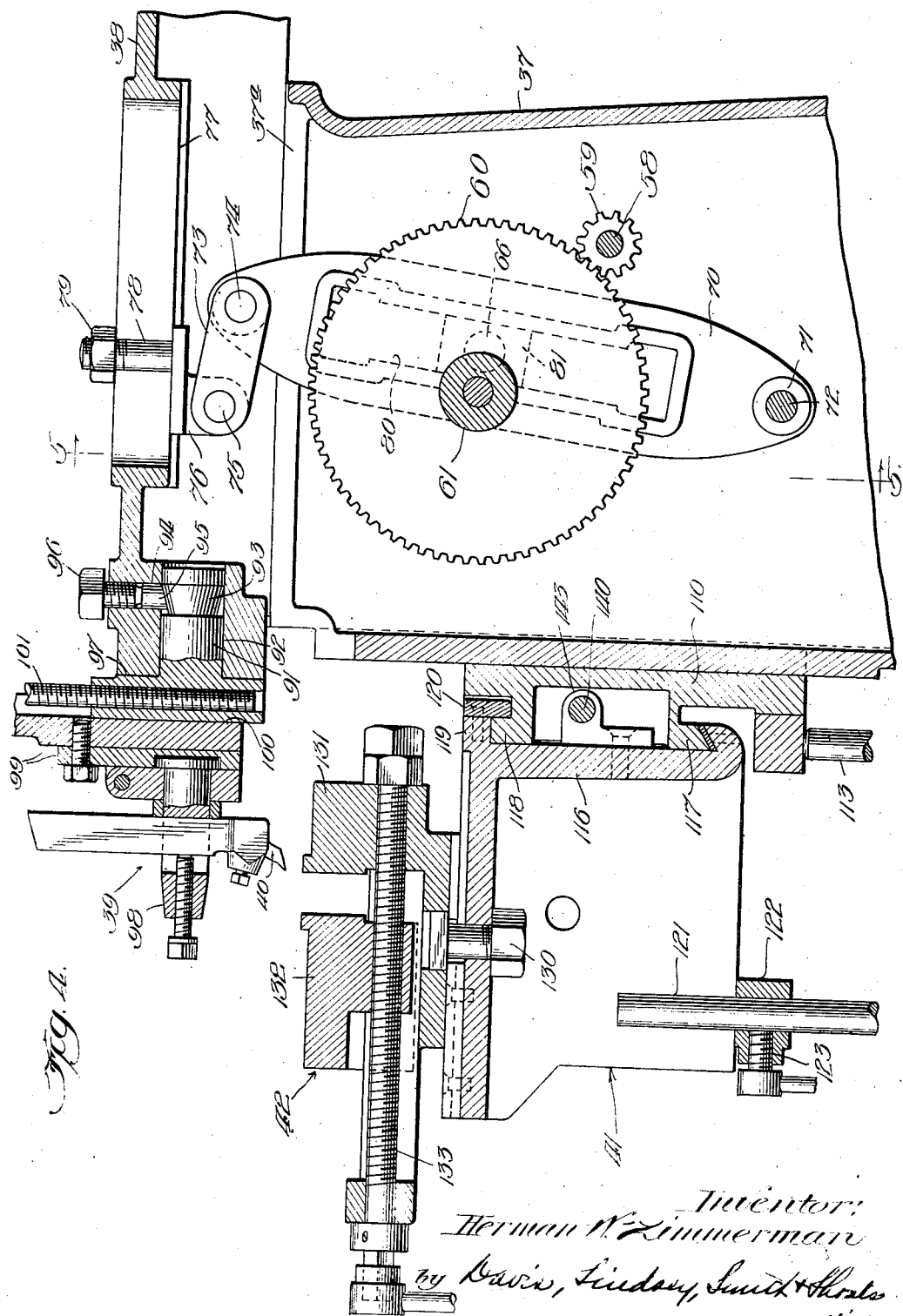

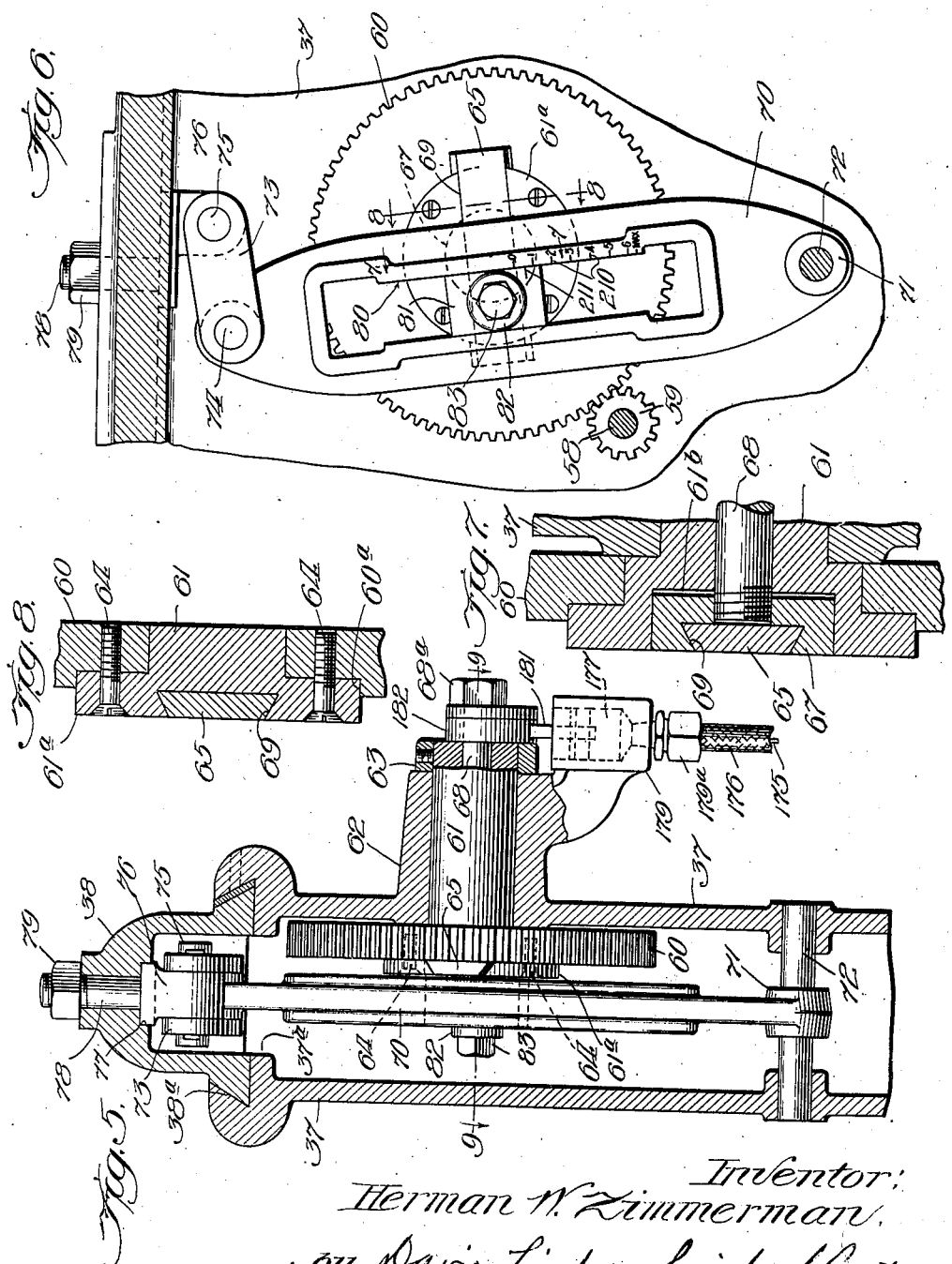

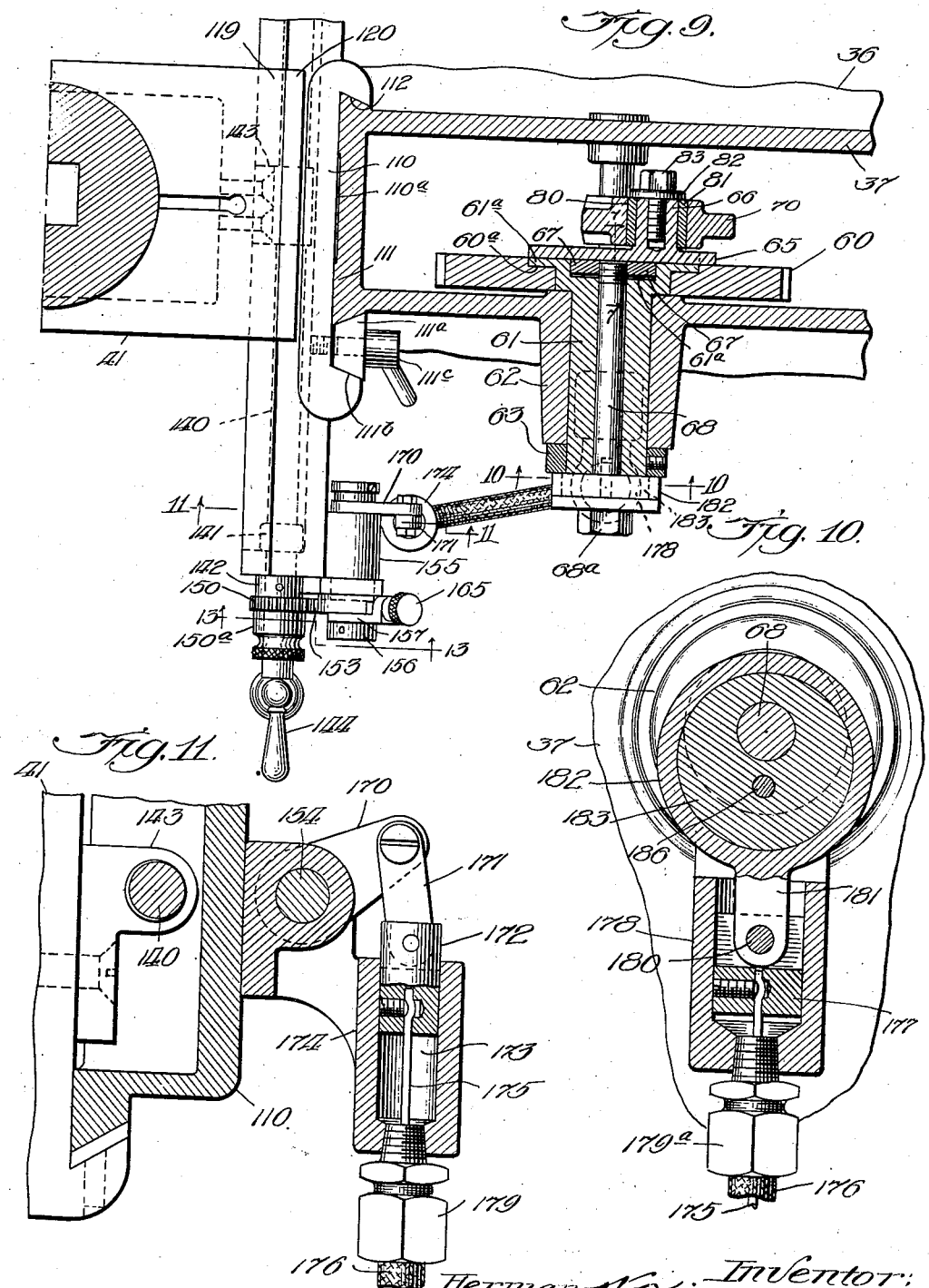

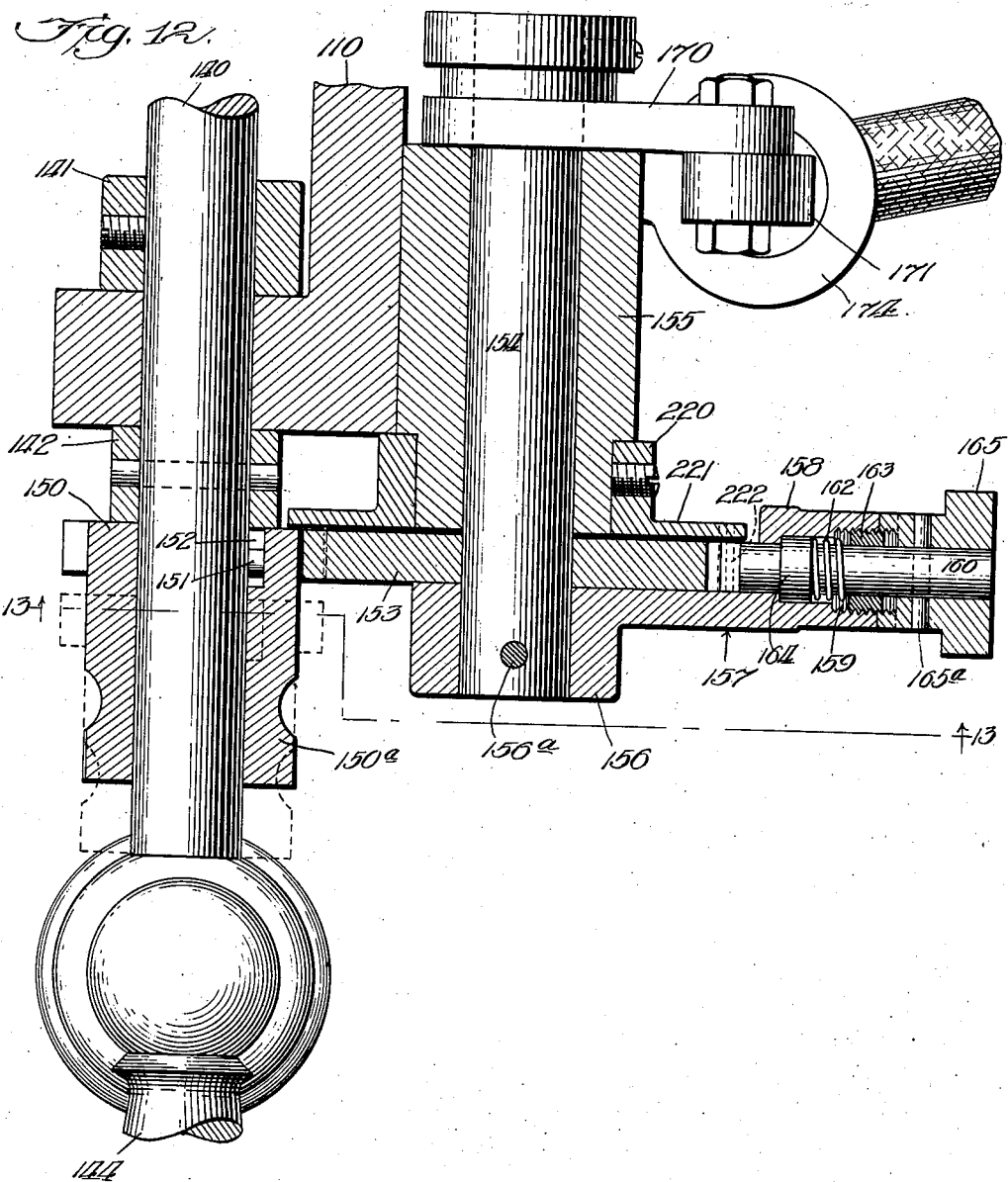

Inventor:
Herman W. Zimmerman
by Davis, Lindsey, Smith & Shonts
Attys.

Nov. 5, 1940.                H. W. ZIMMERMAN                 2,220,382
                              SHAPING MACHINE
                           Filed Oct. 4, 1937            11 Sheets-Sheet 9
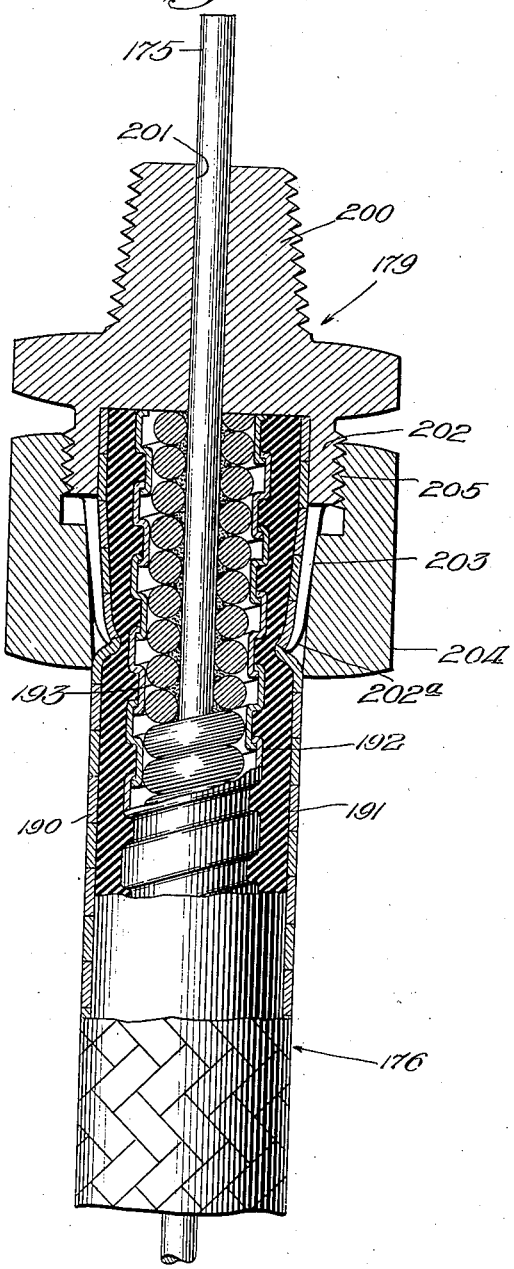
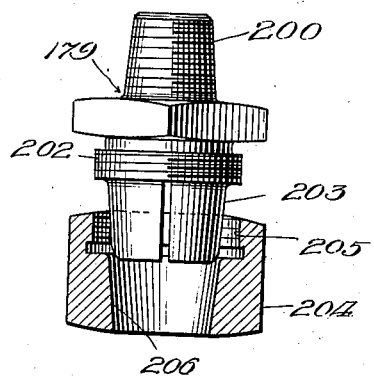
Inventor:
Herman W. Zimmerman
by Davis, Lindsey, Smith & Shonts
Attys.

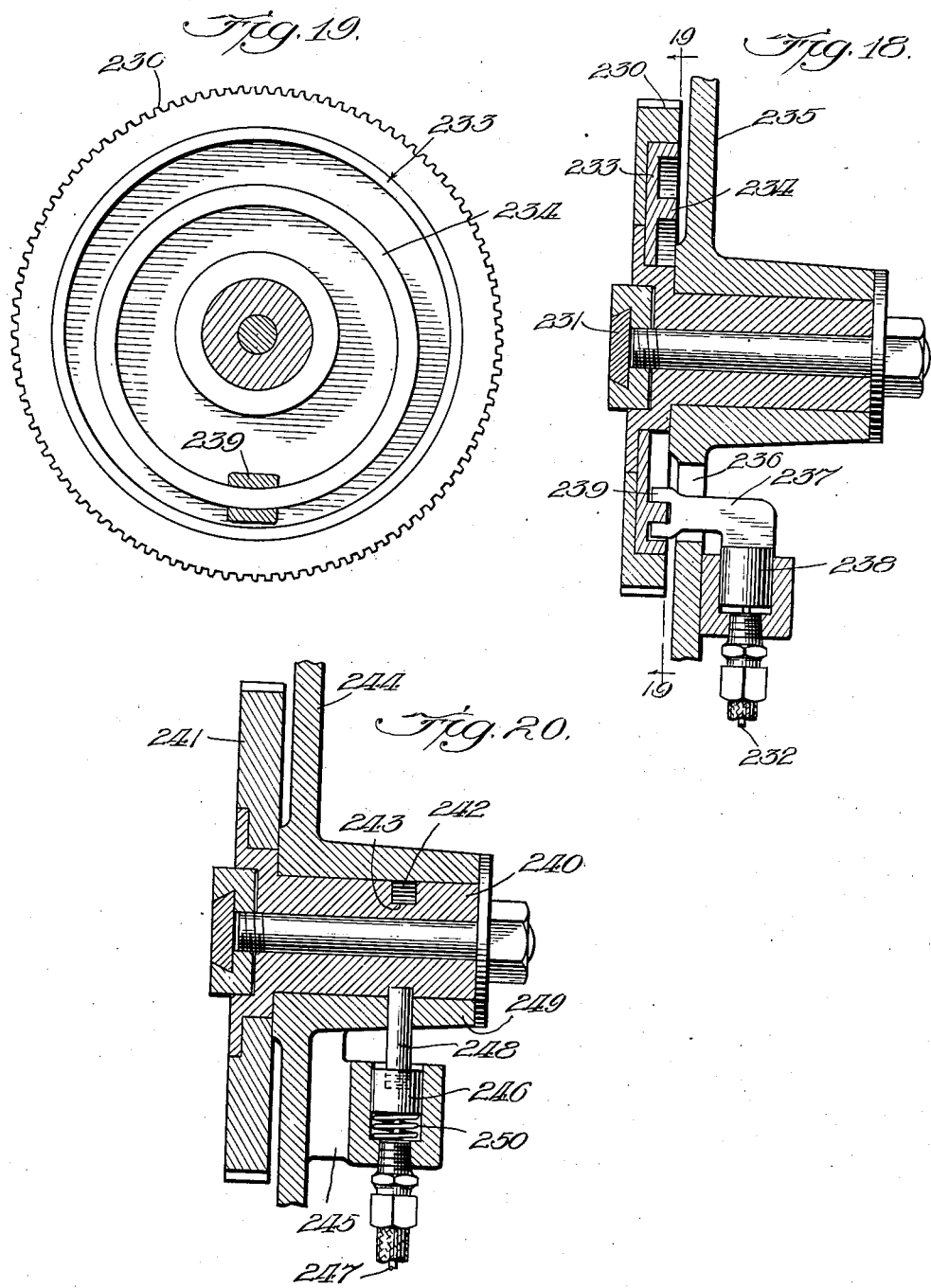

Nov. 5, 1940.    H. W. ZIMMERMAN    2,220,382
SHAPING MACHINE
Filed Oct. 4, 1937    11 Sheets-Sheet 11
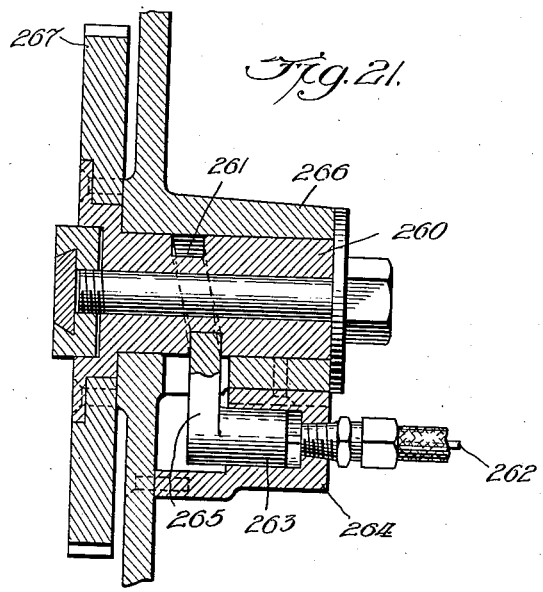
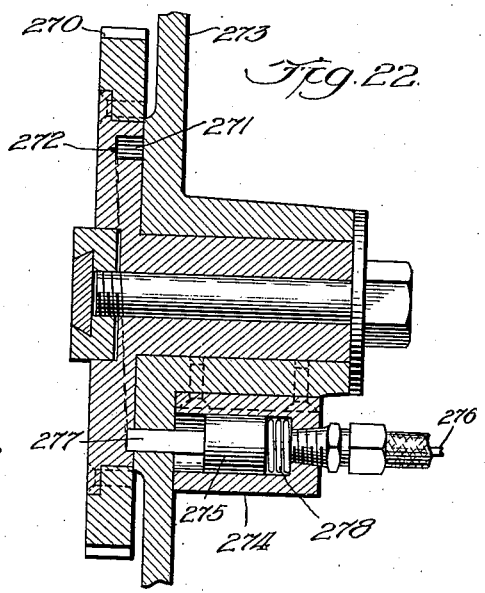
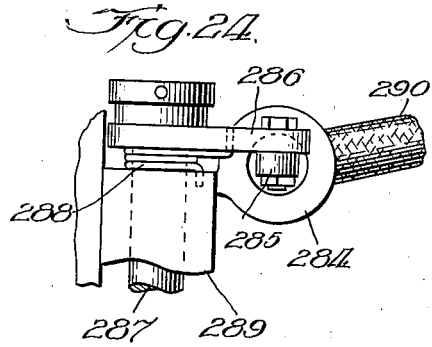
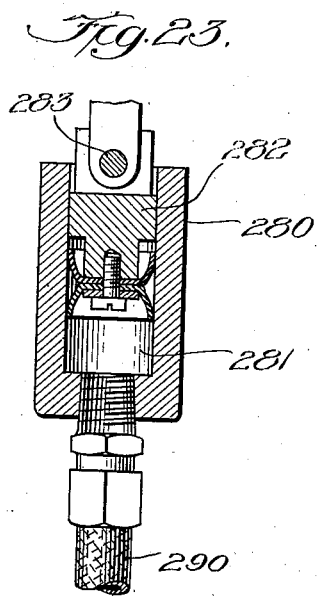
Inventor:
Herman W. Zimmerman,
by Davis, Lindsey, Smith & Shonts
Attys.

Patented Nov. 5, 1940

2,220,382

UNITED STATES PATENT OFFICE 2,220,382

SHAPING MACHINE

Herman W. Zimmerman, Highland Park, Ill., assignor to Automotive Maintenance Machinery Co., North Chicago, Ill., a corporation of Illinois Application October 4, 1937, Serial No. 167,157

24 Claims. (Cl. 90—38)

My invention relates to a shaping machine and it has to do particularly with a power machine of the foregoing character which is well adapted for shaping both large and small pieces of metallic work having various shaped surfaces.

The shaping machines heretofore available have been large and cumbersome devices that are of a highly complicated and expensive nature. The working space required for the same and the cost thereof prohibit the use of such machines in the smaller work or service shops. Such machines greatly increase the cost of work to be done because of their larger size and because of the time required to handle them and set them up for any particular piece of work. There is a demand for a metal working machine in between the drill press and the lathe which will handle the shaping of a flat or irregular surface and, from the standpoint of the small shop owner, the model worker, and the experimental worker, a great need exists for a shaping machine which serves the foregoing purpose, which requires but little working space, and is of an inexpensive nature. Because of the foregoing conditions, it has been necessary for the small workshop operator to resort to the use of makeshift tools and devices with the result that his finished work has been unsatisfactory and comparatively expensive in many cases.

One of the objects of this invention is to provide a machine of the foregoing character which fully meets the foregoing need.

Another object is to provide an improved shaping machine adapted for shaping both large and small pieces of work of various regular and irregular shapes, which machine is of a comparatively simple and inexpensive nature, is of comparatively light weight and can readily be moved about by the operator, is so compact that it occupies but a comparatively small space, and is capable of performing in a highly efficient manner with reduced operating and maintenance costs.

A further object is to provide an improved shaping machine of the foregoing character which is adapted to perform the shaping operations in a precision manner with a minimum of adjustment and attention on the part of the operator, the arrangement of parts being such that adjustments may be made easily, quickly and accurately, and the machine as a whole may be manipulated so easily and quickly that the shaping operations are greatly speeded up and the machine lends itself well to manual training work in schools as well as the other places above mentioned.

A further object is to provide a machine of the foregoing character that embodies a tool supporting and operating ram and which includes improved mechanism for operating the ram and for adjusting both the length of and the position of the ram stroke.

Another object is to provide a machine of the foregoing character having a work support table adapted for both vertical and lateral movements and which embodies improved means for accomplishing such movements. To this end, my invention contemplates mechanism for feeding the table laterally of the direction of movement of the shaping tool, which mechanism is connected to the main drive by means which maintains a constant operating relation between the drive and the feeding mechanism notwithstanding adjustment of the work support at an angle to the movement of lateral feed.

An additional object is to provide an improved drive connection between the power drive mechanism and the mechanism for feeding the work support laterally, which includes a flexible drive member adapted to accommodate turns, bends, and the like, therein, to facilitate drive connection with the work support, in various vertical positions of the latter, without change in the drive relation between the connected parts.

Still another object is to provide a novel conduit or sheath for a flexible drive member adapted to be reciprocated therein for transmitting motion from one part to another, which sheath is so constructed and arranged that, while it may be flexed throughout its length to various shapes, it will not expand or contract to any material extent whereby the flexible drive member is held against flexing and buckling in all flexed positions of the sheath, and the drive relation between the drive and driven parts remains constant notwithstanding the flexed position or condition of the sheath.

Another object of the invention is to provide an operating mechanism for actuating the tool carrying ram which includes a drive crank member and improved structure for supporting the latter in close relation to the main drive mechanism and for adjustably connecting it to such drive mechanism for variation in the length of stroke of the shaping tool.

Other objects and advantages will become apparent as this description progresses and by reference to the drawings wherein—

Figure 1 is a side elevational view of one form of shaping machine embodying my invention;

Fig. 2 is a front elevational view of the structure shown in Fig. 1;

Fig. 3 is a top plan view of the structure shown in the previous figures;

Fig. 4 is an enlarged partial longitudinal sectional view taken substantially along line 4—4 of Fig. 3;

Fig. 5 is a fragmental transverse sectional view taken substantially on line 5—5 of Fig. 4;

Fig. 6 is a fragmental view of the crank and rocker structure shown in Fig. 4, the same being viewed from the side of the machine opposite that shown in Fig. 4;

Fig. 7 is an enlarged fragmental section taken substantially on line 7—7 of Figs. 6 and 9 and illustrating part of the connection between the ram operating crank and the drive mechanism;

Fig. 8 is an enlarged fragmental sectional view taken substantially on line 8—8 of Fig. 6 and further illustrating a part of the structure shown in Fig. 7;

Fig. 9 is a horizontal sectional view further illustrating the driving mechanism and the connections between such mechanism and the work supporting feed mechanism, which view is taken substantially on line 9—9 of Fig. 5;

Fig. 10 is an enlarged sectional view taken substantially on line 10—10 of Fig. 9;

Fig. 11 is an enlarged sectional view taken substantially on line 11—11 of Fig. 9 and illustrating a part of the mechanism by which drive motion is transmitted to the work support feeding mechanism;

Fig. 12 is an enlarged and somewhat distorted horizontal sectional view through the mechanism for feeding the work support table in lateral direction, which view is taken substantially along line 12—12 of Fig. 13;

Fig. 16 is an enlarged view, partially in section, of the end portion of the drive conduit between the power drive mechanism and the mechanism for feeding the work support laterally of the machine;

Fig. 17 is an assembly view, partially in section, of the end fitting member supporting the end of the conduit shown in Fig. 16;

Fig. 18 is a vertical sectional view of a modified form of mechanism for transmitting feed motion from the driving mechanism to the work support feeding mechanism;

Fig. 19 is a section taken substantially along line 19—19 of Fig. 18;

Fig. 20 is a view similar to Fig. 18 of still another form of mechanism for imparting drive motion to the mechanism for feeding the work support in lateral direction;

Figs. 21 and 22 are views similar to Figs. 18 and 20 of still further modified forms of mechanisms for imparting motion to the table feeding mechanism;

Figure 13:
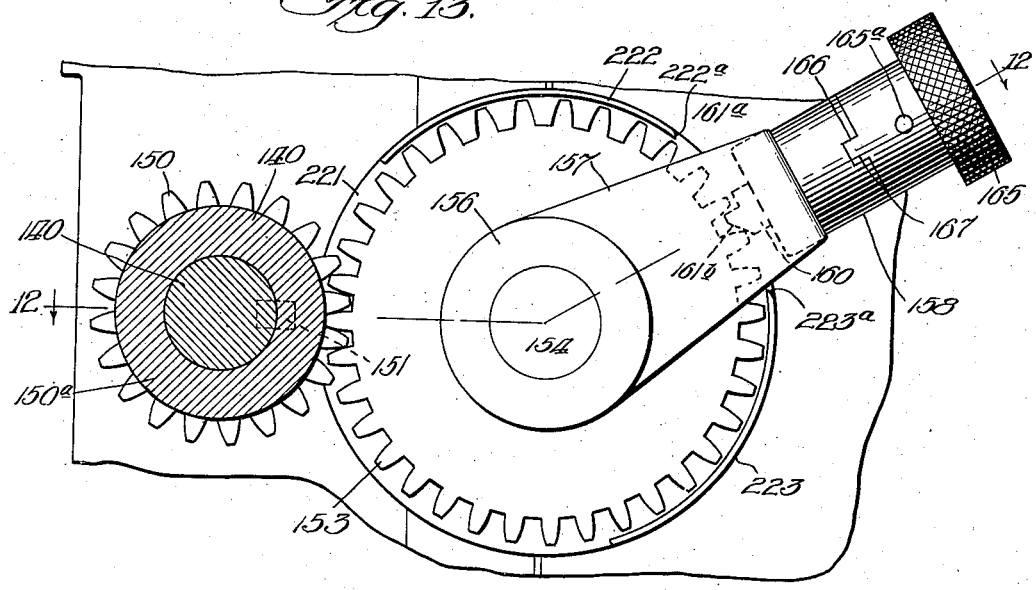
Fig. 13 is a vertical sectional view taken approximately along line 13—13 of Fig. 9 and also along line 13—13 of Fig. 12, looking in the direction of the arrow A on the latter figure.

Fig. 23 is a fragmental sectional view of a hydraulic device by which motion may be transmitted from the driving mechanism to the table feeding mechanism; and Fig. 24 is a fragmental top plan view of another part of the motion transmitting mechanism adapted to be associated with the structure of Fig. 23 and which, together with the structure of Fig. 23, is adapted to apply an oscillating intermittent motion to the table feeding mechanism from a continuously rotating driving mechanism.

General structure

In general, the structure illustrated in the drawings includes a stand 30 of sufficient height to support the operating parts of the machine at a position convenient for the operator. The stand is provided with legs 31 (Fig. 1) having feet 32 (Fig. 3) which provide a frame support and which, if desired, may be secured to a floor or other suitable supporting surface. If desired, the feet 32 may be provided with casters (not shown) for ready portability of the structure. The stand is further provided with a horizontal shelf 33 beneath its top 34 and this shelf supports a motor 35 which drives the mechanism to be described hereinafter.

The shaping machine mechanism includes a base 36 which has an upstanding housing portion 37 (Figs. 1, 2, 3 and 5) which encloses a portion of the driving mechanism which imparts reciprocatory movement to a tool carrying ram 38. The forward end of the ram 38 supports a tool head 39 in which is secured a shaping tool 40 (Figs. 1 and 4). At the forward end of the housing 37, I provide a work supporting table 41 which is adapted for both vertical and lateral movements for properly positioning the work with respect to the tool 40 and for feed of the work laterally for making cuts of various widths and at various positions along the work. The work supporting table 41 carries a suitable vise structure 42 (Figs. 1 and 4) in which the work 43 is secured in proper operating relation with respect to the shaping tool 40. The same driving mechanism that drives the ram 38 forward and backward is also utilized to impart lateral feed movement to the work supporting table 41 and this is accomplished by means of a flexible drive connector 44 and ratchet mechanism 45 (Figs. 1 and 9 to 12, inclusive) which will be described in detail hereinafter.

Main drive mechanism

The drive mechanism includes, in addition to the motor 35, a drive belt 50 (Figs. 2 and 3) connected with a relatively small pulley 51 on the motor drive shaft 52 and a larger pulley 53 on a cross shaft 54 carried by a bearing member 55 suitably carried by the top 34 of the table 30. The shaft 54, at its end opposite the pulley 53, is provided with a step pulley 56 (Figs. 2 and 3) which is drive-connected to another step pulley 57 carried by a cross shaft 58 journaled in the housing 37. The cross shaft 58, within the housing 37, supports a comparatively small gear 59 (Fig. 4) which meshes with a large gear 60 having a tubular hub portion 61 (Figs. 4, 5 and 9) which extends through the side wall of the housing 37 and finds rotative bearing in a laterally extending bearing boss 62 projecting from the side of the housing 37. The gear hub 61 extends through and beyond the boss 62 and a collar 63 is mounted on its outer end for securing the same and the gear 60 rotatably in the boss 62. In this way the inner end of the boss 62 serves as a thrust bearing for the gear 60, and the drive action applied through the gear is more efficient due to the closeness of the power application to the rotatable support for the gear.

The gear 60 is, preferably, made of a suitable fibrous material and, for that reason, its hub 61 is formed separately therefrom (Figs. 5, 8 and 9). More particularly, the face of the gear 60 opposite the boss 62 is provided with an annular recess 60a in which a large annular flange 61a at the end of the hub 61 is received and secured by screws, or other fastening devices, 64. For a reason which will become obvious, the hub flange 61a is thicker than the depth of the gear recess 60a. The hub 61, just inwardly of its flange 61a, is provided with a somewhat reduced annular portion which is also received in an axial opening in the gear 60, the main bearing portion of the hub being of still further reduced diameter to properly engage in the gearing boss 62. It will be seen from the foregoing that, when the motor 35 is cut in, the gear 60 is continuously driven rotatably at a predetermined speed which may be determined by the particular conditions of use.

*The ram and its drive connections*

The ram 38 is of a sufficiently strong construction to readily withstand the usages to which a machine of this character is subjected, and it is slidably mounted in the top of the housing 37 by a dove-tailed slide connection 38a (Figs. 2 and 5).

The ram 38 is driven backwardly and forwardly through the gear 60, and the mechanism for accomplishing this is of such character that the greatest driving efficiency from the power applied is utilized by locating the power transmitting connections as closely as possible to the gear 60 and its supporting shaft 61.

Specifically, referring to Figs. 6, 7, 8 and 9, the ram drive connections include a crank member 65 which is adjustably connected directly to the gear 60 in such a way that, by adjusting the same along the diameter of the gear, the crank arm may be lengthened or shortened to lengthen or shorten the stroke of the ram. The crank 65 takes the form of an elongated flat plate-like arm having near one end thereof a cylindrical crank arm 66 (Fig. 9). The central portion of the gear hub flange 61a is provided with an annular recess 61b (Figs. 7 and 9) in which is received an annular disk-like plate 67 to which is secured a stud 68 that passes axially through and beyond the end of the gear hub 61. The outer surface of the disk 67 is flush with the outer surface of the hub flange 61a, and the hub flange 61a and the plate 67 are provided with aligned diametrical dove-tail slots forming a continuous slot 69 passing through both thereof. The crank 65 is provided with side edges suitable for dove-tailed connection and it is slidably received in the slot 69 where it is clamped in any predetermined longitudinally adjusted position by applying axial pressure to the screw stud 68 to place inward tension on the plate 67. More particularly, the outer end of the screw stud 68 receives a nut 68a which seats against certain eccentric drive mechanism (Figs. 9 and 10) which will be described later. By tightening the nut 68a, the disk plate 67 and stud 68 are pulled axially inward relative to the hub flange 61a thereby clamping the crank against the dove-tail groove surfaces in the hub flange 61a on the opposite sides of the hub flange recess 61b. By loosening the nut 68a, the crank may be slid along the dove-tail groove 69 to position its crank arm 66 closer to or farther away from the axis of rotation of the gear 60, thereby shortening or lengthening the crank arm for varying the stroke of the ram 38.

The crank 65 is connected to the ram 38 through a rocker 70 (Figs. 4, 5, 6 and 9) which is disposed in a generally vertical position in the housing 37. The lower end of the rocker is rockably supported at 71 upon a cross shaft 72 carried by the housing 37. The upper end of the rocker 70 passes upwardly through an elongated opening 37a (Fig. 5) in the top wall of the housing 37 and into the ram which is of inverted U-shape in cross section. The upper end of the rocker 70 is connected to the ram 38 by a link 73 pivotally connected at one end, as at 74, to the rocker and at its other end, as at 75, to a depending lug 76 carried by the ram 38. The upper wall of the ram is provided with an elongated slot 77 through which passes a threaded lug stud 78 adapted to be secured adjustably at different positions along the slot 77 by a nut 79. It will be seen that, with the construction just described, rock movement of the rocker 70 backwardly and forwardly will impart like movement to the ram 38 and, by positioning the rocker attachment lug 76 at different positions along the ram slot 77, the position of beginning and ending of the stroke of the ram may be varied to suit the particular shaping conditions to be carried out.

Rock movement of the rocker 70 is accomplished through the crank 65 as follows: The rocker 70 is provided with a longitudinally extending slot 80 (Figs. 4, 6 and 9) having squared side surfaces providing a slideway in which a slide block 81 is slidably received. The slide block 81 is provided with an annular opening in which the crank arm 66 is rotatably received, and the crank arm and block are held in this operative condition by a washer 82 secured in place by a threaded stud 83 passing therethrough into a threaded opening in the crank arm 66. With the foregoing parts connected in this manner, rotation of the gear 60, in turn revolving the eccentrically located crank arm 66, causes the block 81 to reciprocate in the rocker slideway 80 and move the rocker 70 from one side to the other of the axis of the gear imparting a power rock movement thereto and to the ram 38 (Figs. 4, 5, 6 and 9).

*Tool carrying head*

The tool carrying head 39 which is supported at the forward end of the ram includes a cylindrical shank 91 (Fig. 4) that is received in a cylindrical opening 92 in the forward end of the ram. The inner end of the shank 92 is provided with a reduced wedge surface 93 adjacent which there is provided an opening 94 in the ram in which is received a metallic plug 95 having a wedge surface complemental to and engaging the wedge surface 92 of the shank. The outer end of the ram opening 94 is threaded for reception of a threaded screw 96 which forces the plug 95 inwardly against the wedge surface 92 thereby locking the tool head 39 against displacement from the ram and also locking the tool head in any desired position to which it may be rotated for properly positioning the shaping tool 40 with respect to the work.

The tool head 39 is further provided with a squared face 97 which seats against a complemental squared surface at the front end of the ram for holding these parts in true axial alignment and against displacement in the operation of the tool. The front end of the tool head supports a tool carrier 98 which supports the tool 40 in such a way that it may be adjusted vertically relative to the head. The tool holder 98 is carried by a vertically shiftable unit 99 which is connected to the tool head through a dovetailed slot arrangement 100, and which is adjustable vertically by a screw 101 passing through the unit 99 and the portion of the head which is directly connected to the ram 38. This adjustment, together with the shank connection 91, provides a tool mounting of universal character.

Work table and its mounting

The work table 41 is carried by a vertically shiftable carriage member 110 (Figs. 4 and 9) which is slidably connected with the forward end of the housing 37 for vertical adjustment movement. To this end, the forward end of the housing 37 is provided with a slide track 111 and the carriage 110 is provided with a slide seat portion 110$^a$ which is slide connected to the track 111 by a dovetailed slide slot 112. One side of the dovetail connection just referred to takes the form of a clamp block 111$^a$ confined between the forward track wall of the housing 37 and an inclined surface 111$^b$ on the carriage 110. The clamp block is wedged in place by one or more clamp screws 111$^c$ which when tightened move the clamp block to lock the carriage in its vertical position.

Vertical slide adjustment of the carriage is accomplished by a screw member 113 (Figs. 1, 2 and 4) threadedly engaging a base portion 114 in the machine base 36 and projecting upwardly from the latter to engage the lower side portion of a lug 115 at the bottom of the carriage 110. By rotating the screw 113 in clockwise direction, the carriage 110 may be raised and by rotating such screw in the reverse direction the carriage may be lowered.

The work table 41 is connected to the carriage 110 for transverse slide movement and, to that end, the table is provided with a rear wall 116 (Figs. 4 and 11) adapted to be slidably interlocked with and supported by vertically spaced transverse flanges 117 and 118 forming a transverse track on the forward portion of the carriage 110. The interlock between the table and the flange 117 is of the dovetail type while that between the flange 118 is of such character as to permit ready detachment and separation of the parts. Specifically, the top wall of the table is provided with a rearwardly extending flange 119 which overlies and rides upon the upper edge of the carriage flange 118, and the table flange 119 has a transverse locking plate 120 detachably secured thereto which projects into a suitable recess inwardly of the upper edge of the flange 118 to prevent outward displacement of the table while permitting of lateral slide movement thereof.

The forward end of the work table 41 is separately supported for work alignment purposes and also for facilitating and insuring free lateral sliding movement of the table without wedge or cramping action. To this end, the forward end of the machine base is provided with an upstanding standard 121 (Figs. 1, 2 and 4) upon which is slidably received a horizontal transverse plate member 122 adapted to engage the lower edges of the side walls 41$^a$ of the work table. The plate 122 is adapted to be locked in position at the desired position along the standard 121 by a locking screw 123 and the plate is of sufficient length to support one or both of the side walls of the work table throughout the entire lateral feed movement of such table. In vertically positioning the table with the structure above described, the adjusting screw 113 may be first actuated to set the table at the proper position. When this is done, the front supporting plate 122 is then moved to firmly engage the forward end of the table and it is then locked in that position.

The work holding vise 42 carried by the table may be secured thereto in any desired manner as by the bolt and nut 130 illustrated in Fig. 4. The vise may take any suitable form such, for example, as a stationary jaw 131 and a movable jaw 132 actuated toward and from the jaw 131 by a suitable adjusting screw 133. In some instances, the vise may be omitted and the work supported directly on the table 41 in any desired manner.

Work table feed mechanism

In the use of a tool of this character, the ram 38 is moved forwardly during the cutting stroke. The tool 40 is so mounted in its holder 40$^a$ that, on the back stroke of the ram, it is free to move upwardly away and release itself from the work to permit the back travel of the ram without any cutting operation. Also, it is customary in many shaping operations to feed the work supporting table transversely of the cutting tool and I provide feed mechanism for that purpose. In the structure illustrated, the arrangement is such that the work table 41 is fed laterally of the cutting tool during the backward, non-cutting stroke of the ram, and this transverse movement may be caused to take place in either direction relative to the cutting tool. In other words, the table remains stationary during the tool cutting operation but, as the tool conditions itself for a new cut, the table moves laterally to position the work for such new cut.

The mechanism for feeding the table transversely includes a transverse screw 140 (Figs. 2, 4, 9, 11 and 12) extending laterally between the carriage flanges 117 and 118 and having its outer end rotatably mounted in the adjacent end of carriage 110 and secured therein against longitudinal displacement by lock collars 141 and 142 (Fig. 12) secured thereon. A suitable nut member 143 is secured to the back wall 116 of the work table and it is engaged by the screw 140 in such a way that, by rotating the screw in one direction, the table 41 will be shifted toward the right as viewed from the front of the machine and, by rotating it in the opposite direction, the table will be shifted oppositely. The outer end of the screw 140 is provided with a handle 144 through which it may be actuated to manually shift the table, if that should be desired. In the general operation of the machine, however, the table is shifted automatically in proper timed relation with respect to the movements of the ram 38 and I will now describe the mechanism by which such movement may be accomplished.

The outer end portion of the screw 140 is provided with an axially shiftable gear 150 (Figs. 1, 2, 9 and 12) which is normally connected thereto for driving motion therewith by a pin 151 (Fig. 12) engaging in a slot 152 in the hub portion of the gear. The slot extends to one end of the gear 150, permitting the hub portion 150$^a$ of the gear to be grasped and slid axially along the shaft toward the handle 144 for purposely disengaging the gear 150 from operative relation with the screw 140 to permit hand operation of the screw 140 without actuating the automatic feed mechanism with which such gear 150 is connected. The inoperative position of the gear just referred to is illustrated by the dotted line position of the gear unit shown in Fig. 12.

The gear 150 is normally connected to the main drive mechanism contained within the housing 37 by mechanism which includes a larger gear 153 rotatably mounted upon the outer end of a shaft 154 journaled in a bracket 155 mounted on the rear portion of the carriage 110. It will be seen that connection between the gears 150 and 153 is broken when the former is moved to its dotted line position of Fig. 12. Gear 153 is retained in position on the outer end of the shaft 154 by the hub portion 156 of a pawl unit 157 which is fixedly secured to the shaft 154 by a pin 156a. The pawl unit is operatively connected with the teeth of gear 153 and by rocking the shaft 154 back and forth the gear 153 is intermittently rotated, in turn, imparting similar movement to the feed screw 140.

The pawl unit 157 (Fig. 12) includes a casing 158 having a cylindrical chamber 159 disposed in alignment with the teeth of the gear 153. A pawl member 160 extends through the chamber 159 and casing 158 into engagement with the teeth of the gear 153. The pawl 160 is yieldably retained in operative engagement with the gear teeth by a spring 162 mounted in the chamber 159 and confined between a screw plug 163 and an enlarged guide bearing 164 on the pawl member. The spring 162 permits the pawl 160 to slip over the teeth of gear 153 in the backward motion of the pawl unit and it also permits manual outward movement of the pawl to disengage the same from the gear 153. This latter action may readily be accomplished by a finger piece 165 on the outer end of the pawl stem 160.

The gear-engaging end of the pawl 160 is provided with a tip having a right-angled shoulder 161a on one side and a tapered surface 161b on its other side whereby, when it is engaged with the teeth of the gear 153 and moved forwardly, it will act to positively impart motion to the gear but, when it is moved in the opposite direction, the inclined surface 161b will cam the pawl element 160 inwardly against the action of spring 162, permitting the pawl to be retracted to a starting position without transmitting movement to the gear. For example, assuming that the pawl element is engaged with the gear in the manner shown in Fig. 13, counterclockwise movement of the pawl will rotate the gear 153 in like direction and cause feed of the screw 140 in one direction but, when the pawl is moved in the opposite direction, the table will remain stationary.

Figure 15:
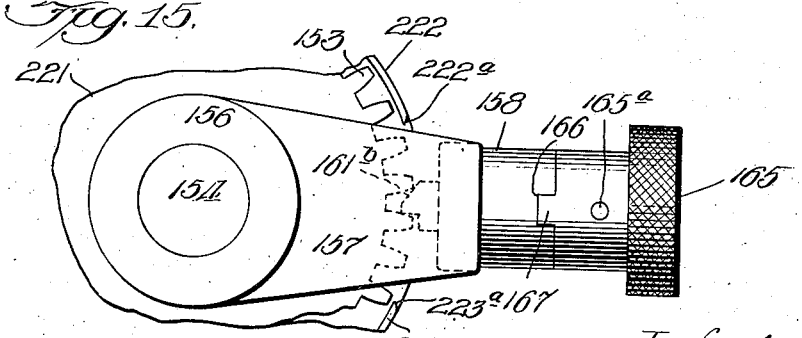
Fig. 15 is a view similar to Fig. 14 except illustrating the mechanism in position for a reverse table feed operation.

The pawl member is so constructed that it may be reversed in order to reverse the direction of feeding movement of the table. To that end, the pawl member 160 is so constructed as to permit of rotation thereof to reverse the gear pickup action of the pawl tip. Specifically, the pawl casing 158 is provided at its outer open end with diametrically opposed notches 166 and the finger piece 165, to which the pawl member 160 is fixed by a pin 165a, is provided with a diametrically depending tongue 167 adapted to fit into the notches 166. The right-angled and inclined surfaces of the tip of the pawl member 160 are so related to the notches 166 that, when the finger piece tongue 167 is engaged therein as shown in Fig. 13, the pawl is set for movement of the gear 153 in one direction. However, when the finger piece 165 is pulled outwardly and rotated to reverse the positions of the pawl tip surfaces, as shown in Fig. 15, the pawl structure is set for movement of the gear 153 (and the work table) in the opposite direction. Also, by moving the finger piece 165 outwardly and turning it out of engagement with the notches 166, the tongue 167 will ride on the outer surface of the pawl casing 158 and hold the pawl element out of engagement with the teeth of gear 153, permitting the work table to be manually adjusted laterally by operation of the handle 144.

From the foregoing, it will be seen that, by rocking the shaft 154 back and forth, the pawl unit will be moved back and forth, thereby imparting feed movement to the screw 140 and the work table 41. The shaft 154 is rocked back and forth by means of a flexible drive connection between such shaft and eccentric mechanism actuated by the main gear 60 and its hub 61 as hereinabove mentioned.

*Work table feed drive connection*

The drive connection for the work table feed mechanism includes an arm 170 (Figs. 9, 11 and 12) fixed at one end to the shaft 154 and pivotally connected at its other end to the upper end of a link 171. The lower end of the link 171 is connected to a slide block or piston member 172 reciprocably guided in a vertically disposed chamber 173 in a bracket member 174 carried by the carriage 110. The piston 172 is connected to the main drive mechanism by a flexible drive wire 175 which is sheathed in a guide conduit 176 which will be described in more detail hereinafter. One end of wire 175 is secured to the slide block 172 and its other end is secured in another piston-like slide block 177 mounted in a vertical slide chamber in a bracket 178 carried by the bearing boss 62 on the housing 37. One end of the guide conduit 176 is connected by a suitable fitting 179 to the bottom of the bracket 174 and its other end is connected by a similar fitting 179a to the bottom of the bracket 178 so that the wire 175 is guided throughout its movement for reciprocating the slide block 172 in accordance with reciprocatory movements given to the slide block 177. The slide block 177 is pivotally connected at 180 to depending ear 181 of an eccentric strap 182 (Fig. 10). The eccentric strap 182 is mounted upon an eccentric member 183 which is operatively clamped and secured to the outer end of the gear hub 61 as best shown in Fig. 9. Specifically, the stud 68 which passes through the gear hub 61 projects outwardly beyond the end of such hub and its projecting end passes through the eccentric 183 and receives the nut 68a which when tightened serves to hold the eccentric rigid with the hub and also to lock the crank 65 in its predetermined adjusted position as hereinabove mentioned. In order to operably confine the eccentric strap 182, the outer peripheral edge of the eccentric 183 is provided with a circumferential enlarged flange (Fig. 9) which, together with the locking collar 63, serves the intended purpose. In order to hold the eccentric in properly centered relation with respect to the gear 60 and its hub 61, I employ a pin 186 passing through aligned openings in the eccentric and the outer end of the hub 61. With this construction, as the gear 60 is rotated, in turn rotating the eccentric 183, the eccentric strap 182 is caused to take a reciprocatory movement which is transmitted to the slide block 177 and, in turn, to the wire 175. This motion is transmitted through the wire 175 to the piston block 172 and thence to the rock shaft 154 to move the pawl structure back and forth to impart intermittent rotary feed movement to the screw 140 for moving the work table 41 laterally of the work.

The flexible drive connection between the main drive mechanism and the lateral feed shaft 140 permits of vertical adjustment of the work table 41 without the necessity of changing or adjusting the drive connection between these parts. This is an important feature of my invention to the end of facilitating the carrying out of the shaping operations and speeding up of such work. In machines heretofore employed, the drive connection between the parts in question has been of such character as to require some compensating adjustments in the drive connections in the case of vertical adjustment of the work table. The flexible drive connection, including the wire 175 and its sheath 176, is so constructed and arranged that it may be flexed and bent as desired to accommodate the adjustment in question and the sheath is so constructed that the drive wire 175, although flexible, is prevented from buckling or becoming distorted in any way, upon pressure being applied longitudinally thereto, thereby avoiding any change in the effective driving length of the connection which might, in turn, if it should take place, change the relative feed stroke at different positions of the table.

Drive sheath or conduit

To the foregoing end, I employ a novel form of sheath which, in its assembled relation to the driving structure, may be readily flexed and bent but which is not subjected to any material expansion or contraction which might tend to permit the wire 175 to buckle. The sheath, while flexible, performs its function in all flexed conditions similarly to a rigid close-fitting conduit around the wire 175. Specifically, referring to Figs. 16 and 17, the sheath 176 takes the form of an outer covering 190 formed of fabric or other similar material. Next to this covering there is a layer of rubber 191 which is vulcanized to a sectional, flexible type of metal tubing 192 comprised of a plurality of interlocking flexible sections which permit of a contracting action but prevent expansion. This metal tubing is of such character that it will permit the same to be flexed angularly in bent formation without separating the sections that form the tubing. Within the metal tubing 192, I provide a spring wire 193 having the coils thereof formed in close fitting relation so that the spring is capable of being expanded but not compressed. By associating the contractible (but not expansible) tubing 192 with the non-contractible (but expansible) spring wire 193 and by locking them together as a unit in their extreme non-expansible and non-contractible conditions, I provide a tubing which is neither contractible nor expansible to any material extent but which is capable of being bent or flexed without distorting the guide passage in the conduit for the wire 175. The inside diameter of the wire 193 is such that the wire 175 fits snugly therein and the entire arrangement is such that any tendency of the wire to buckle when endwise pressure is applied thereto is entirely avoided in all flexed conditions of the cable.

The sheath sections are fixedly connected together at the ends of the sheath by fittings already indicated, respectively, by the numerals 179 and 179ª. Since these fittings are identical, only one will be described in detail. The fitting 179 includes a threaded nozzle portion 200 (Figs. 16 and 17) and has an opening 201 extended axially therethrough for slide guidance of the wire 175. The nozzles 200 are adapted to be screwed, respectively, into the bottoms of the piston block chambers 174 and 178. Each nozzle has a depending, tubular, externally threaded portion 202, the outer end of which is provided with an annular series of flexible fingers 203 which, together with the tubular portion 202, are adapted to snugly receive the end of the assembled sheath structure. A nut 204 surrounds the sheath inwardly of the nozzle 200 and it is provided with a threaded part 205 adapted to engage the threaded portion 202 for securing the parts together. The nut 204 is further provided with an outer unthreaded portion 206 that tapers outwardly to a diameter less than that of the flexible finger portion 203. Therefore, as the end 204 is screwed upon the part 202, the fingers 203 are forced inwardly to grippingly engage and lock the end attachment unit to the sheath. The ends of the fingers 203 are turned inwardly slightly as at 202ª so that they grip the sheath in such a manner as to prevent endwise slipping of the attachment unit therefrom. With the parts thus assembled, the opposite ends of the spring wire 193 abut the respective shanks 200 and this is also true of the outer sheath structure around the wire 193; so that, when the end attachment fitting is secured in place as described, the parts of the sheath are not permitted to move endwise relatively to each other thereby insuring the non-contractible and non-expansible features above mentioned.

General operation

In the operation of the structure so far described, the piece of work to be shaped is first secured in the vise 42 on the work table. The work table is then adjusted to the proper vertical position for shaping this particular piece of work. The tool head 39 is then adjusted in the ram 38 so as to position the tool 40 in proper relation with respect to the work or the portion of the work where the shaping cut is to be made. After that has been done, the position of the stroke of the ram is properly set, if that need be done; and, upon determining the length of the stroke or the length of the cut, the crank 65 is adjusted to give that particular stroke. To aid in making this adjustment, the rocker 70 is provided with a scale 210, along one side adjacent the slideway 80, and the crank block 81 which slides therein is provided with an indicating mark 211 adapted to register with the graduations on the scale 210. The graduations of the scale 210 may take any suitable form each representing a certain stroke length. To set the stroke, the gear 60 is rotated to a position wherein the crank 65 and rocker 70 are substantially parallel with the crank aligned with the slideway 80. The nut 68ª on the end of the stud 68 is then loosened, freeing the crank 65 for slide movement, and the crank, along with the block 81, is moved up or down until the mark 211 on the block coincides with the proper graduation on the rocker scale 210 corresponding to the length of stroke desired. The nut 68ª is again tightened, clamping the crank 65 in adjusted position as hereinabove explained.

Figure 14:
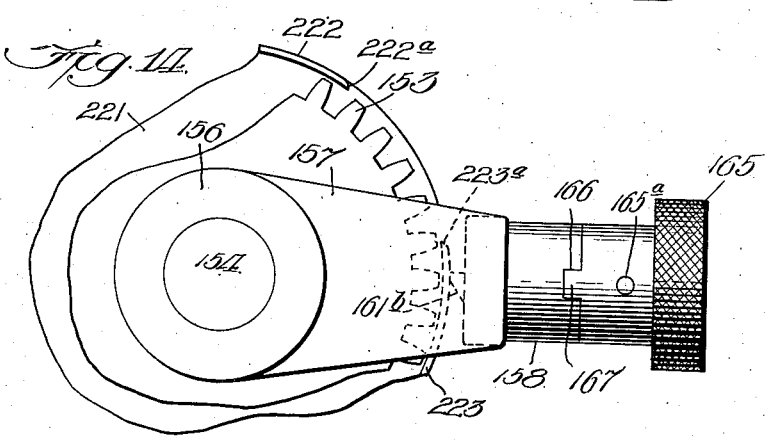
Fig. 14 is a fragmental view of a portion of the structure shown in Fig. 13 and illustrating the parts thereof in another position of operation.

In originally setting the machine, it may be necessary to regulate the extent of lateral feed of the work table to suit the particular shaping operation to be carried out. To this end, I provide structure which enables the lateral feed stroke to be lengthened or shortened. More particularly, referring to Figs. 12 to 15, inclusive, the bearing bracket 155 adjacent the gear 153 is of reduced diameter to receive the hub 220 of a cylindrical plate memer 221 extending along the side of the gear 153 and having laterally extending separated peripheral flanges 222 and 223 which overlie, in spaced relation, the teeth of the gear 153. The end 222ᵃ of the flange 222 and the end 223ᵃ of the flange 223 are spaced apart the same distance at all times and the pawl and ratchet structure for feeding the shaft 140 is arranged so that the pawl element picks up the teeth of the gear 153 between these spaced ends of these flanges. By rotating the disk 221 to position the flanges 222 and 223 at different positions around the periphery of the gear 153 relative to the operating limits of the pawl structure, the pawl structure may be caused to pick up the gear 153 sooner or later in the operating stroke of the feed mechanism. That is to say, the pawl structure reciprocates between definite limits. By adjusting the flanges 222 and 223 counter-clockwise around the gear 153, the pawl element 161ᵇ in its backward movement (Fig. 13) will override the plate flange 223 as shown in Fig. 14 so that, in its forward movement, it will not immediately pick up the gear 153, this being done only after the pawl member passes beyond the end of the flange element 223. By rotating the flanges 222 and 223 in the opposite direction, the pawl will pick up the gear sooner and will cause a greater feed stroke than in the previously described operation. This same adjustment and operation takes place in the reverse position of the pawl as shown in Fig. 15, the same as described above.

With the machine set in the above manner, the motor 35 is cut in thereby driving the gear 60 and, in turn, moving the rocker 70 back and forth under the control of the crank 65. This movement of the rocker causes forward and backward movement of the ram 38, during forward movement of which the shaping tool makes its cut, and on the backward stroke the shaping tool is deflected out of operating relation to the work. The work table 41 remains stationary on the forward cutting stroke of the ram with the pawl mechanism set in the positions shown in Figs. 12 to 14, inclusive, the mechanism, including the eccentric structure above described, being so set that at this time the pawl structure is moving backwardly, and reaches the end of its backward stroke at the time the ram completes its forward stroke. As the latter starts its backward stroke, the pawl structure starts its forward stroke, moving the table laterally during the non-cutting operation of the cam. This operating sequence may be changed by changing the relative positions of the eccentric strap 182 and 183 relative to the operating positions of the crank 65. That is to say, assuming that the relation of the parts shown in Fig. 10 is that which exists at the end of the back stroke of the ram, this condition may be reversed so that it exists at the forward stroke of the ram by setting the eccentric 183 around 180° from the position shown in Fig. 10.

*Modified work table drive connections*

The mechanism for transmitting intermittent lateral feed motion to the work table 41 may take various forms, some of which are illustrated in Figs. 18 to 24, inclusive. Referring to the form shown in Figs. 18 and 19, it includes a main drive gear 230 corresponding to the drive gear 60 of the first form. The drive gear 230 supports a crank 231 similar to the crank 65 and is also arranged to directly impart reciprocatory movement to a feed wire 232 corresponding to the wire 175. Specifically, the outward face of the gear is provided with an inset plate member 233 having an annular, but eccentric, track 234. The side wall housing 235 adjacent the gear 230 is provided with a slot 236 through which projects an arm 237 connected to the upper end of a piston-like slide block 238 to which the wire 232 is connected. The arm 237 is provided with a bifurcate end portion 239 which embraces the trackway 234 so that, as the gear 230 rotates, the eccentric track element 234 moves the bifurcations 239 of the arm to cause the piston 238 to reciprocate and transmit similar motion to the wire 232. Other than just described, the construction and operation of the feed mechanism may be the same as that of the first-described form.

The feed mechanism shown in Fig. 20 is similar to that of Figs. 18 and 19 except that the hub 240 of the main drive gear 241 (corresponding to the gears 60 and 230) is provided with a circumferential slot 242, the base of which is shaped to provide an eccentric camway 243. The side wall of the housing 244 beneath the hub 240 supports a bracket 245 having a vertical chamber in which a piston-like block 246 is adapted to reciprocate. This block is connected to a feed wire 247 similar to the wires 175 and 232. The upper end of the piston block 246 is provided with a stem 248 projecting upwardly through an opening in the housing boss 249 with its inner end engaged in the slot 242 in seated relation against the camway 243. The piston block is constantly urged upwardly to hold the stem 248 in operating relation with the camway 243 by a spring 250. This spring, in this manner, aids in reciprocating the piston 246 and, in turn, the feed wire 247. In this form, as the gear 241 and its hub 240 rotate, the piston block 246 is caused to reciprocate, in turn reciprocating the wire 247 and causing lateral feed of the work support table.

The structure shown in Fig. 21 is similar to that of Fig. 20 except that the gear hub 260 is provided with a concentric cam slide 261 so constructed as to transmit motion in a direction axial of the hub 260. The feed wire 262 (similar to the feed wire 175) is connected to a piston block 263 mounted to reciprocate in horizontal direction in a chamber in the housing carriage bracket 264. The piston block 263 is provided with a right angled upstanding arm 265, the end of which projects through the housing block 266 into the cam slot 261 so that, as the main drive gear 267 (corresponding to gears 60, 230 and 241) rotates, the piston block 263 and feed wire 262 are reciprocated horizontally to transmit lateral feed motion to the work table.

In the feed mechanism shown in Fig. 22, the main drive gear 270 is provided on its outward face with an annular slot 271 of uniformly varying depth around its circumference providing a cam surface 272 adapted to transmit motion axially of the gear 270 as the latter is rotated. The side wall of the housing 273 supports a bracket 274 having a chamber in which a piston slide block 275 is horizontally mounted. A feed wire 276 (similar to the feed wires 175, 232, etc.) is connected to the piston block 275 for reciprocation therewith. Reciprocation of the piston block 275 is accomplished by a stem 277 thereon which projects through the side wall of the housing 273 into the cam slot 271 where it engages the cam surface 272. As the gear 270 rotates, the piston block 275 and wire 276 are reciprocated, in an obvious manner, to cause feed of the work table through mechanism which may be of a character similar to that already described. The piston block 275 is held in operative relation against the cam surface 272 by a spring 278 which functions similarly to the spring 250 of the form of Fig. 20.

In Figs. 23 and 24, I have shown a hydraulic means for transmitting feed motion from the main drive mechanism to the feed screw for moving the work table transversely. In this form, I employ a casing member 280 adapted to be carried by the machine housing in close proximity to the main driving mechanism, similarly to the bracket 178 of the first-described form. This casing is provided with a fluid chamber 281 in which is mounted a hydraulic piston member 282. This piston member may be pivotally connected at 283 to the main driving mechanism in any of the ways previously described. A flexible conduit 290 is connected at one end to the fluid chamber 281 and at its other end to another similar fluid chamber contained in a casing member 284 (Fig. 24) corresponding to the casing or bracket portion 174 (Fig. 11) of the first form. The chamber of the casing member 284, corresponding to the fluid chamber 281, is provided with a hydraulic piston (not shown) which is similar to the piston 281 and which is, in turn, connected by a link structure 285 to an arm 286 corresponding to the arm 170 of the first form. The arm 286 is connected to a rock shaft 287 which is connected similarly to the rock shaft 154 (Fig. 11) to the feed mechanism directly connected with the work table for feeding it transversely of the tool operating ram. The fluid chamber 281, the conduit 290 and the chamber in the casing 284 are completely filled with a hydraulic fluid and, as the main drive mechanism moves the piston 282 downwardly, the piston in the casing 284 is moved upwardly raising the arm 286 and moving the rock shaft 287 in counterclockwise direction to apply a feed movement similarly to that described in connection with the first form. As the main drive mechanism operates to raise the piston 282, a spring 288, surrounding the rock shaft 287 and engaged at its opposite ends with a bearing 289 supporting the rock shaft and the arm 286, causes the arm 286 to move downwardly forcing the piston in the casing 284 and, in turn, forcing the fluid backwardly to condition the operating parts and the fluid in the manner illustrated in Figs. 23 and 24. Other than just described, the operation of this form is the same as that of the first-described form.

Summary of advantages

It is believed that the advantages of my invention as hereinabove first stated will be well appreciated from the foregoing description. My invention supplies a need in the small workshop field. It provides a machine capable of performing a large number of shaping operations and which is so simple so far as operation and adjustment are concerned that it well serves the purpose in the hands of the unskilled as well as the skilled workman. It fills a distinct need in the manual training school field and other places where the use of the prior cumbersome, expensive and complicated shaping machines is prohibitive. My invention further provides a machine which, although of small size and inexpensive construction, is adapted to perform its work in a highly accurate manner and in much less time due to simplification of manipulation.

Although I have shown and described various forms of my invention, other changes in details and arrangement of parts may be made therein without departing from the spirit and scope of my invention as defined by the claims which follow.

I claim:

1. In structure of the class described, a work support, drive mechanism, and mechanism for feeding said work support in one direction which includes a feed member associated with said work support, a flexible member between said drive mechanism and said feed member reciprocable by said drive mechanism for imparting feed movement to said feed member, and means for guiding said flexible member in its reciprocating movement.

2. In structure of the class described, a work support, means for adjusting said work support in one direction, drive mechanism, and mechanism for feeding said work support in another direction which includes a feed member associated with said work support, a flexible member between said drive mechanism and said feed member reciprocable by said drive mechanism for imparting feed movement to said feed member in all adjusted positions of said work support without change in the operating relation between said drive mechanism and feed member, and means for guiding said flexible member in its reciprocating movement.

3. In structure of the class described, a work support, drive mechanism, means for adjusting said work support in one direction, means including a feed member for moving said table in another direction, and means connecting said drive mechanism to said feed member for imparting feed movement to the latter, said connecting means including a reciprocable flexible member and means for guiding said flexible member whereby to accommodate said adjustment of said work table without breaking any connecting parts and without change in drive relation therebetween.

4. In structure of the class described, a work support, drive mechanism, means for adjustably positioning said work support relative to a shaping tool, and means connecting said drive mechanism to said feed member for imparting feed movement to the latter, said means including a member reciprocably driven by said drive mechanism, a second reciprocable member associated with said feed member for imparting movement to the latter, a flexible connection between said reciprocable members and through which reciprocation of the first of said reciprocable members is imparted to the second of said reciprocable members.

5. In structure of the class described, a work support, drive mechanism, means for adjusting said work support toward and from a shaping tool, a feed member connected to said work support for feeding it transversely of its direction of adjustment, and means connecting said drive mechanism to said feed member for imparting feed movement to the latter, said means including a member reciprocably driven by said drive mechanism, a second reciprocable member associated with said feed member for imparting movement to the latter, a flexible member between said reciprocable members and through which reciprocation of the first of said reciprocable members is imparted to the second of said reciprocable members, said flexible member being constructed to permit of bends and turns therein to accommodate said adjustment of said work support, and means sheathing said flexible member and constructed and arranged to prevent buckling of said flexible member when it is reciprocated.

6. In structure of the class described, a drive member, a work supporting table mounted for movements transversely of each other, means for moving said table in one direction, and means for moving said table transversely of said one direction in any position to which it may be adjusted in said one direction which includes a feed member operably connected to said table and which upon being actuated imparts lateral feed movement to said table, and means for imparting intermittent movement to said feed member including an elongated flexible drive connector adapted to be reciprocated, means for guiding said flexible connector in its reciprocating movement, a connection between one end of said connector and said drive member by which the former is reciprocated, and a connection between the other end of said drive connector and said feed member by which reciprocation of the former is transmitted to the latter.

7. In structure of the class described, a drive member, a work supporting table mounted for vertical and lateral movements, means for moving said table vertically, and means for moving said table laterally in all of its vertical positions which includes a feed member operably connected to said table and which upon being rotated imparts lateral feed movement to said table, and means for imparting intermittent rotative movement to said feed member including an elongated flexible drive connector adapted to be reciprocated, guide means for said flexible drive connector, a connection between one end of said connector and said drive member by which the former is reciprocated, gear means operably engaged with said feed member, and a pawl mechanism engageable with said gear means and connected to the other end of said connector by which reciprocal movement of said connector is transmitted to said gearing for intermittent rotation of said feed member.

8. In structure of the class described, a drive member, a work supporting table mounted for movement back and forth and transversely thereof, means for moving said table back and forth, and means for moving said table transversely in all of its positions of back and forth movement which includes a feed member operably connected to said table and which upon being rotated imparts lateral feed movement to said table, means for imparting intermittent rotative movement to said feed member including an elongated flexible drive connector adapted to be reciprocated, guide means for said flexible connector, a connection between one end of said connector and said drive member by which the former is reciprocated, gear means associated with said feed member, a pawl mechanism connected to the other end of said connector comprising a pawl member adapted to engage said gear means positively upon movement in one direction to cause intermittent rotation of said feed member and adapted to ride freely over said gear means upon movement in the other direction, and means for reversing said pawl member whereby it is caused to ride freely over said gear means upon movement in the first-mentioned direction and to engage the gear means positively upon movement in the other direction to cause intermittent rotation of said feed member in a direction opposed to that above first mentioned.

9. In structure of the class described, a drive member, a work supporting table mounted for movement toward and from and transversely of a shaping tool, means for moving said table toward and from the shaping tool, and means for moving said table transversely in all positions of its movement toward and from the shaping tool, which includes a feed member operably connected to said table and which upon being rotated imparts lateral feed movement to said table, means for imparting intermittent rotative movement to said feed member including an elongated flexible drive connector adapted to be reciprocated, guide means for said flexible connector, a connection between one end of said connector and said drive member by which the former is reciprocated, gear means associated with said feed member, a pawl mechanism connected to the other end of said connector comprising a pawl member adapted to engage said gear means positively upon movement in one direction to cause intermittent rotation of said feed member and adapted to ride freely over said gear means upon movement in the other direction, and means for varying the position of beginning of operative positive engagement between said gear means and said pawl member whereby the extent of each intermittent movement of said feed member may be varied.

10. In structure of the class described, a drive member, a work supporting table mounted for movement toward and from and transversely of a shaping tool, means for moving said table toward and from the shaping tool, and means for moving said table transversely in all of its positions of movement toward and from the shaping tool, which includes a feed member operably connected to said table and which upon being rotated imparts lateral feed movement to said table, and means for imparting intermittent movement to said feed member including an eccentric device operably connected to said drive member, a reciprocable element pivotally connected to said eccentric device, an elongated flexible drive connector rigidly connected to said reciprocable element, guide means for said flexible connector, another reciprocable element rigidly connected to the other end of the drive connector, a pawl mechanism operably connected to said other reciprocable element, and gear means operably connected to said feed member for the transmission of rotative movement thereto and adapted to be engaged by said pawl mechanism for rotative movement of said feed member upon reciprocation of said reciprocable elements and drive connector by said eccentric device.

11. In structure of the class described, a drive member, a work supporting table mounted for movement toward and from and transversely of a shaping tool, means for moving said table toward and from the shaping tool, and means for moving said table transversely in all of its positions of movement toward and from the shaping tool, which includes a feed member operably connected to said table and which upon being rotated imparts lateral feed movement to said table, means for imparting intermittent movement to said feed member including an elongated flexible drive connector adapted to be reciprocated, guide means for said flexible connector, a connection between one end of said connector and said drive member by which the former is reciprocated, said connection comprising an eccentric drive means operably connected to said drive member and a reciprocable element connected to said eccentric means and to said flexible connector, gear means operably connected with said feed member, and means between the other end of said connector and said feed member by which reciprocation of the former is transmitted to the latter, comprising another reciprocable element connected to the other end of said flexible connector, a pawl mechanism operably connected to said last mentioned reciprocable element and engageable with said gear means to cause rotation of the latter upon reciprocation of said reciprocable element.

12. In structure of the class described, a drive member, an elongated flexible drive connector adapted to be subjected to endwise pressure for the transmission of reciprocal movement from one mechanism to another, guide means for said flexible connector, and means connecting said drive member and said drive connector for causing reciprocal movement of said drive connector comprising an eccentric member operably connected to said drive member, an eccentric strap surrounding said eccentric member, a reciprocable element pivotally connected at one of its ends to said strap and fixedly connected at its other end to one end of said flexible drive connector whereby rotary motion of said drive member is transmitted to said drive connector as reciprocal movement.

13. In structure of the class described, a drive member, an elongated flexible drive connector adapted to be subjected to endwise pressure for the transmission of reciprocal movement from one mechanism to another, guide means for said flexible connector, and means connecting said drive member and said drive connector for causing reciprocal movement of said drive connector comprising a plate member operably connected to said drive member for rotative movement therewith and having an annular eccentric track on one surface thereof, a slidable member adapted for reciprocal movement and connected to said drive connector and having a bifurcated portion at one end embracing said eccentric track, whereby said slidable member is reciprocated as said track rotates with said drive member.

14. In structure of the class described, a drive member, an elongated flexible drive connector adapted to be subjected to endwise pressure for the transmission of reciprocal movement from one mechanism to another, guide means for said flexible connector, and means connecting said drive member and said drive connector for causing reciprocal movement of said drive connector comprising a hub operably connected with said drive member for rotative movement and having an annular groove of uniformly varying depth providing a camway therein, a reciprocable member adapted for reciprocal movement having a stem at one end extending into said camway, and a spring constantly urging said reciprocable member and stem into operative engagement with said camway, said reciprocable member being fixedly connected at its other end to one end of said drive connector, whereby rotary motion of said drive member is converted into reciprocal movement for said drive connector.

15. In structure of the class described, a drive member, an elongated flexible drive connector adapted to be subjected to endwise pressure for the transmission of reciprocable movement from one mechanism to another, guide means for said flexible connector, and means connecting said drive member and said drive connector for causing reciprocal movement of said drive connector comprising a hub operably connected with said drive member for rotative movement and having a spiral cam slideway in its outer periphery, a reciprocable member adapted for reciprocal movement within a chamber axially of said hub and having a stem at one end extending into said cam slideway and being fixedly connected at its other end with one end of said drive connector, whereby rotary movement of said drive member is converted into axial reciprocation of said reciprocable member and drive connector.

16. In structure of the class described, a drive member, an elongated flexible drive connector adapted to be subjected to endwise pressure for the transmission of reciprocal movement from one mechanism to another, guide means for said flexible connector, and means connecting said drive member and said drive connector for causing reciprocal movement of said drive connector comprising a plate member operably connected to said drive member for rotative movement and having an annular groove of uniformly varying depth on one surface providing a camway for the transmission of motion axially of said plate member, a reciprocable member adapted for reciprocal movement and having a stem portion at one end extending into said camway, a spring constantly urging said reciprocable member and stem into engagement with said camway, and means for connecting said reciprocable member to one end of said drive connector whereby rotary movement of said drive member is converted into reciprocal movement for said drive connector.

17. In structure of the class described, a drive member, a work supporting table mounted for movement toward and from and transversely of a shaping tool, means for moving said table toward and from the shaping tool, and means for moving said table transversely in all of its positions by movement toward and from the shaping tool, which includes a feed member operably connected to said table and which upon being rotated imparts lateral feed movement to said table, and means for imparting intermittent rotative movement to said feed member which includes an elongated flexible connector tube having its opposite ends immovably supported relative to said table and drive member, respectively, during operation, piston chambers connected to said tube at each end thereof and pistons adapted to reciprocate in each of said chambers, said chambers and said connector tube being filled with a hydraulic fluid, means for connecting said drive member to one of said pistons for reciprocating the latter, and means for connecting the other of said pistons to said feed member for imparting intermittent feed movement thereto as said pistons are reciprocated, including spring means constantly urging said other piston in one direction.

18. A bench shaper including a base, a ram slidably mounted in the top of said base, a tool head at the forward end of said ram, a work table mounted at the forward end of said base beneath said tool head, a feed screw shaft for moving said table crosswise of its support, a crank wheel operatively connected with said ram for reciprocating the same, a gear for turning said feed screw shaft, a ratchet lever for rotating said gear, a flexible shaft connected at one end to said ratchet lever, guide means for said flexible shaft, and a second crank wheel for reciprocating said flexible shaft.

19. In structure of the class described, a work support, drive mechanism, and mechanism for feeding said work support in one direction which includes a feed member associated with said work support, a flexible member between said drive mechanism and said feed member reciprocable by said drive mechanism for imparting feed movement to said feed member, and bendable means accommodating various relative positions of the work support and drive mechanism for guiding said flexible member in its reciprocating movement.

20. In structure of the class described, a work support, drive mechanism, and mechanism for feeding said work support in one direction which includes a feed member associated with said work support, a flexible member between said drive mechanism and said feed member reciprocable by said drive mechanism for imparting feed movement to said feed member, and flexible means bendable from end to end for guiding said flexible member in its reciprocating movement.

21. In structure of the class described, a work support, drive mechanism, and mechanism for feeding said work support in one direction which includes a feed member associated with said work support, a flexible member between said drive mechanism and said feed member reciprocable by said drive mechanism for imparting feed movement to said feed member, and elongated, inexpansible and non-contractible means flexible laterally of its longitudinal axis for guiding said flexible member in its reciprocating movement.

22. In structure of the class described, a work support, means for adjusting said work support in one direction, drive mechanism, and mechanism for feeding said work support in another direction which includes a feed member associated with said work support, a flexible member between said drive mechanism and said feed member reciprocable by said drive mechanism for imparting feed movement to said feed member in all adjusted positions of said work support without change in the operating relation between said drive mechanism and feed member, and elongated guide means adapted to flex from end to end as said work table is adjusted in said one direction for guiding said flexible member in its reciprocating movement.

23. In structure of the class described, a work support, means for adjusting said work support in one direction, drive mechanism, and mechanism for feeding said work support in another direction which includes a feed member associated with said work support, a flexible member between said drive mechanism and said feed member reciprocable by said drive mechanism for imparting feed movement to said feed member in all adjusted positions of said work support without change in the operating relation between said drive mechanism and feed member, an elongated, inexpansible and non-contractible sheath means receiving and guiding said flexible member in its reciprocating movement, and means stationarily supporting said sheath means relative to said flexible member and effecting movement of said sheath means with said work table upon adjustment of the latter in said one direction.

24. In structure of the class described, a work support, drive mechanism, mechanism for feeding said work support in one direction which includes a feed member associated with said work support, means for adjusting said work support angularly of said feed movement of said work support in said one direction, a flexible motion transmitting member between said drive mechanism and said feed member reciprocable by said drive mechanism for imparting feed movement to said feed member, and elongated guide means for said flexible member extending substantially throughout the length of said flexible member and substantially non-depressible and non-extensible in axial direction and flexible laterally of the axis of said flexible member whereby a constant operating relationship will be maintained between said drive mechanism and said feed mechanism through said flexible member notwithstanding adjustment of said work support angularly of the feed movement of said work support in said one direction.

HERMAN W. ZIMMERMAN.